US012616933B2

(12) United States Patent (10) Patent No.: US 12,616,933 B2

Alfnais (45) Date of Patent: May 5, 2026

(54) HOT CIRCULATION ENHANCEMENT IN AMINE UNITS

(71) Applicant: Saudi Arabian Oil Company, Dhahran (SA)

(72) Inventor: Yousef Nassir Alfnais, Al Jubail (SA)

(73) Assignee: Saudi Arabian Oil Company, Dhahran (SA)

( * ) Notice: Subject to any disclaimer, the term of this patent is extended or adjusted under 35 U.S.C. 154(b) by 320 days.

(21) Appl. No.: 18/239,798

(22) Filed: Aug. 30, 2023

(65) Prior Publication Data

US 2025/0073633 A1     Mar. 6, 2025

(51) Int. Cl.
B01D 53/14       (2006.01)
C10L 3/10       (2006.01)

(52) U.S. Cl.
CPC ..... B01D 53/1425 (2013.01); B01D 53/1412 (2013.01); B01D 53/1468 (2013.01); *B01D 53/1462* (2013.01); *B01D 2252/204* (2013.01); *B01D 2257/304* (2013.01); *C10L 3/103* (2013.01)

(58) Field of Classification Search
None
See application file for complete search history.

(56) References Cited

U.S. PATENT DOCUMENTS 9,657,247 B2 *   5/2017  Zink ..................... B01D 53/18

OTHER PUBLICATIONS

Dashti et al., "Sensitivity analysis for selection of an optimum amine gas sweetening process with minimum cost requirement," Asia-Pac. J. Chem. Eng., May 2015, 10(5):709-715, 7 pages.

* cited by examiner

*Primary Examiner* — Gabriel E Gitman

(74) *Attorney, Agent, or Firm* — Dinsmore & Shohl LLP

(57) ABSTRACT

A method for preparing a gas sweetening system for less shutdown time is provided. The method includes stopping a sour gas feed to a gas sweetening system, and raising the set point for a temperature of a lean amine cooler to about 150° F. The $H_2S$ concentration in a lean amine is monitored. The preparation of the gas sweetening system for maintenance is completed when the $H_2S$ concentration reaches a target value.

9 Claims, 5 Drawing Sheets

HOT CIRCULATION ENHANCEMENT IN AMINE UNITS

TECHNICAL FIELD

This disclosure relates to methods of shutdown in amine sweetening systems for service.

BACKGROUND

Gas sweetening is a process used for removing acid gases from gaseous hydrocarbon streams, such as natural gas, termed a sour gas feed. The sour gas feed is contacted with a lean amine which absorbs hydrogen sulfide and carbon dioxide from the natural gas, sweetening the natural gas and forming a rich, or acid gas saturated, amine. The rich amine is passed through a regenerator for reprocessing, which removes the acid gases and regenerates the lean amine.

Diglycolamine (DGA) and methyldiethanolamine (MDEA) are the most the common amine chemicals utilized for acid gases removal. During a shutdown of the unit for Turnaround and Inspection (T&I), a hot circulation process is performed to remove acid gases that remain in the system after stopping the sour gas feed. During the hot circulation process, the amine is circulated inside the amine loop until the concentration of $H_2S$ reaches below low concentration levels in order to ensure safe maintenance work execution. To achieve targeted criteria for $H_2S$ concentration, The duration of the hot circulation process often takes up to 43 hrs. Commonly, the amine loop temperature is maintained and the steam flow inside the regenerator boilers is increased for faster stripping of acid gases.

SUMMARY

An embodiment described herein provides a method for preparing a gas sweetening system for maintenance. The method includes stopping a sour gas feed to a gas sweetening system, and raising the set point for a temperature of a lean amine cooler to about 150° F. The $H_2S$ concentration in a lean amine is monitored. The preparation of the gas sweetening system for maintenance is completed when the $H_2S$ concentration reaches a target value.

DETAILED DESCRIPTION

Embodiments described herein provide a method for decreasing the shutdown time for a gas sweetening system in order to complete maintenance or inspections. The common practice for clearing gas sweetening systems is to maintain the amine temperature at about 130° F. using the lean/rich amine exchangers and amine fin fans coolers at set point. The steam flow inside regenerator reboilers is then increased for faster stripping of acid gases. However, this resulted in clearance times of up to 43 hrs to achieve targeted criteria based on operation instruction manual for $H_2S$ concentration.

The technique is based on raising the temperature of the lean amine by adjusting the set point of an amine fin fan cooler from about 130° F. to about 150° F. to increase desorption of the acid gases. This results in reaching the targeted $H_2S$ concentration in less time and steam, for example, providing a lower $H_2S$ concentration in about 75% less time and decreasing steam consumption by about 23%, as less steam flow will be needed. Thus, the reduction in steam consumption reduces fuel gas consumption by 8 MMSCF, which provides 0.53 kTons of reduction in $CO_2$ emissions.

Figure 1:
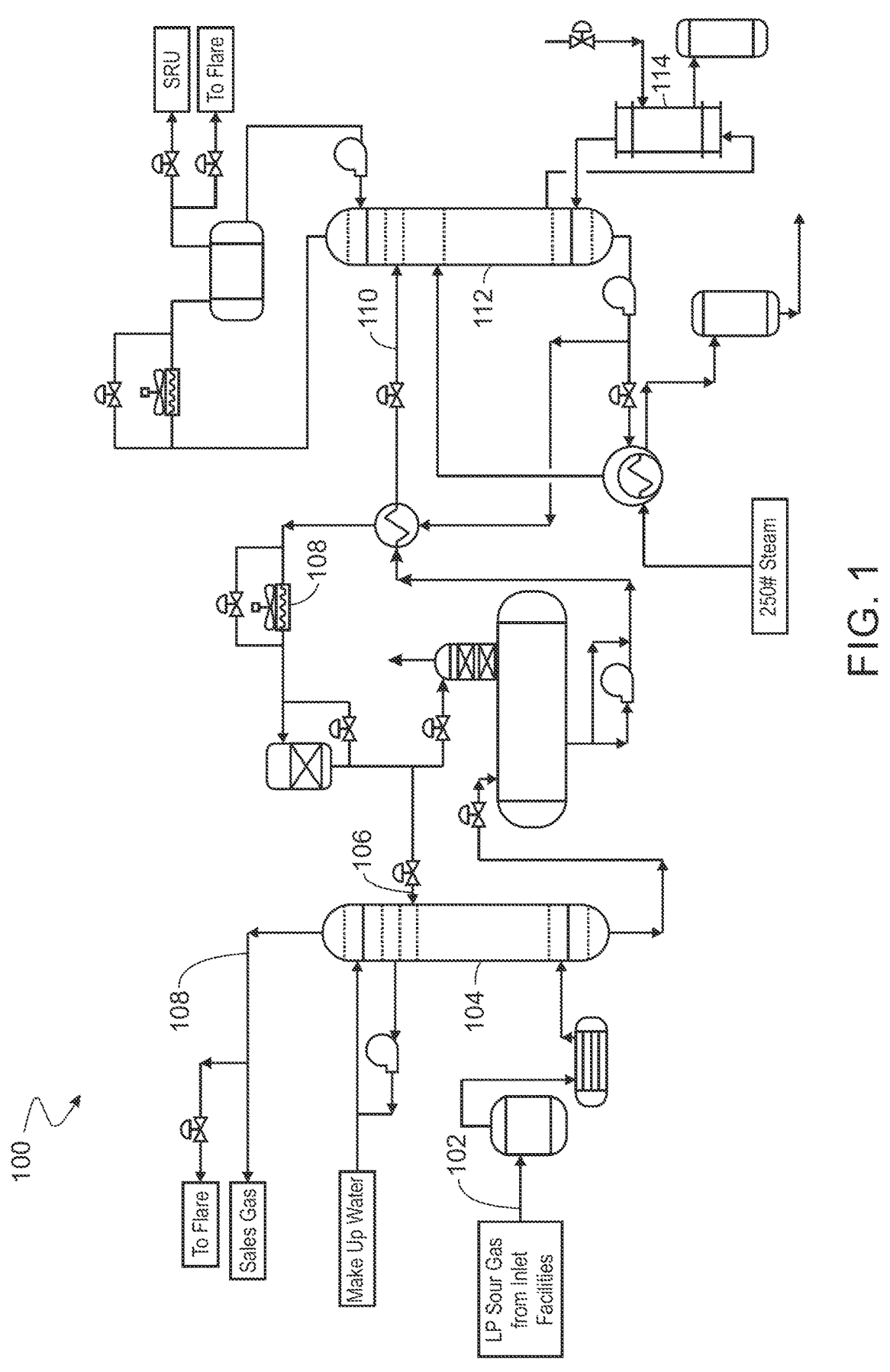
FIG. 1 is a simplified process flow diagram of a gas sweetening system.

FIG. 1 is a simplified process flow diagram of a gas sweetening system 100. In the gas sweetening process, $H_2S$ and $CO_2$ are absorbed from sour gas 102 in a contactor column 104. The acid gases interact with lean amine 106, such as DGA or MDEA, with differential temperature of higher than about 15° F. for optimum absorption. The sweet gas 108 exits the contactor 104 from the top with less than about 4 ppm $H_2S$ concentration and less than about 50 ppm $CO_2$ concentration, depending on the product specifications. Variations in the temperature of the lean amine 106 entering the contactor may change the concentration of the $H_2S$ and $CO_2$, as the solubility of these acid gases in the amine changes depending on the temperature and type of amine. The temperature of the lean amine 106 can be controlled by adjusting the set point of an amine fin fan cooler 108. After absorbing the acid gases in the contactor 104, the resulting rich amine 110 is processed in a regenerator 112 which strips the acid gases from the rich amine 110, reforming the lean amine 106. The stripping rate in the regenerator 112 is controlled by steam flow through a reboiler 114. This is discussed further with respect to FIGS. 3 and 4.

Figure 2:
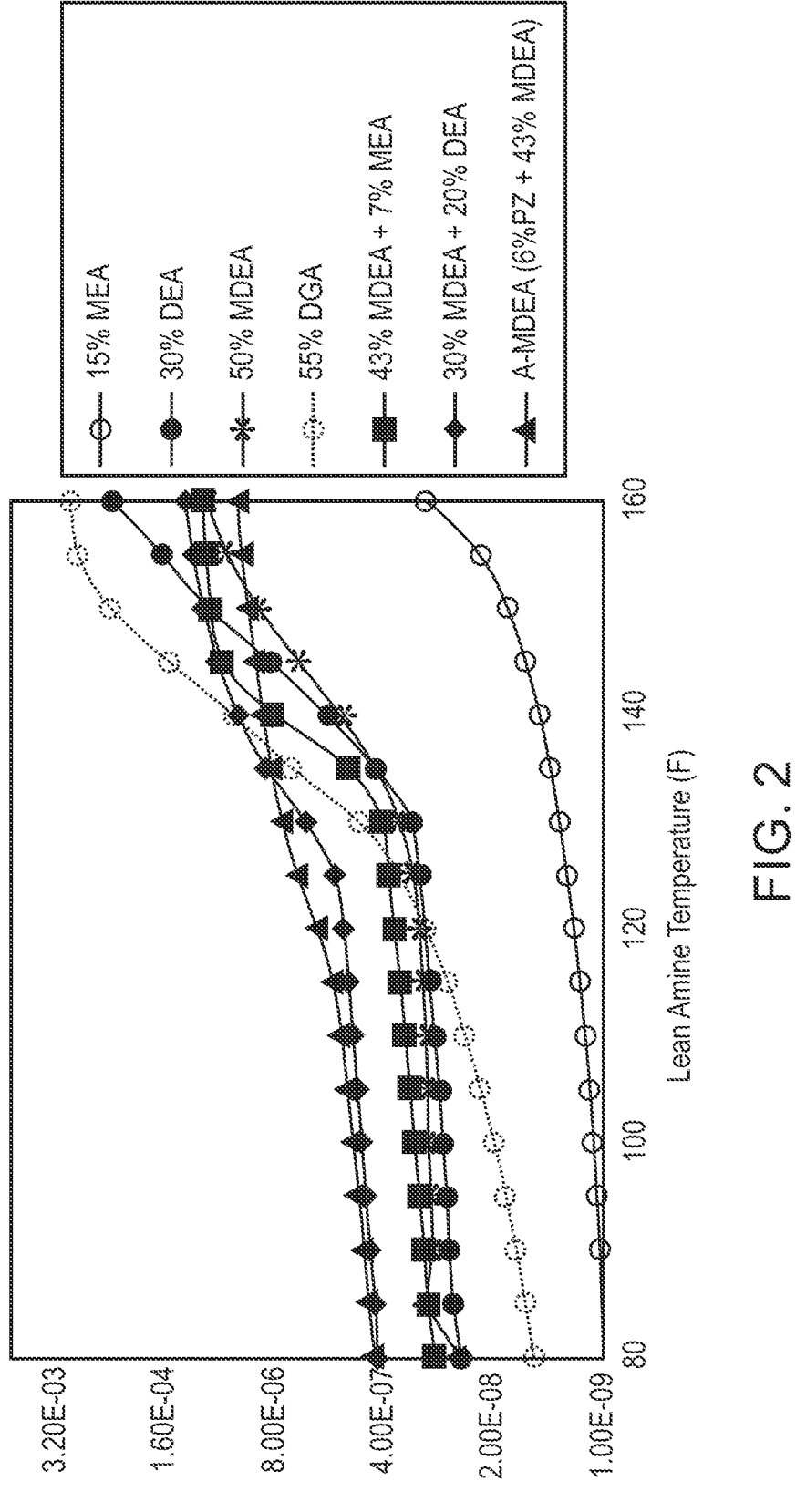
FIG. 2 is a plot of the $H_2S$ concentration in the sweet gas as a function of the temperature of the lean amine.
Figure 3:
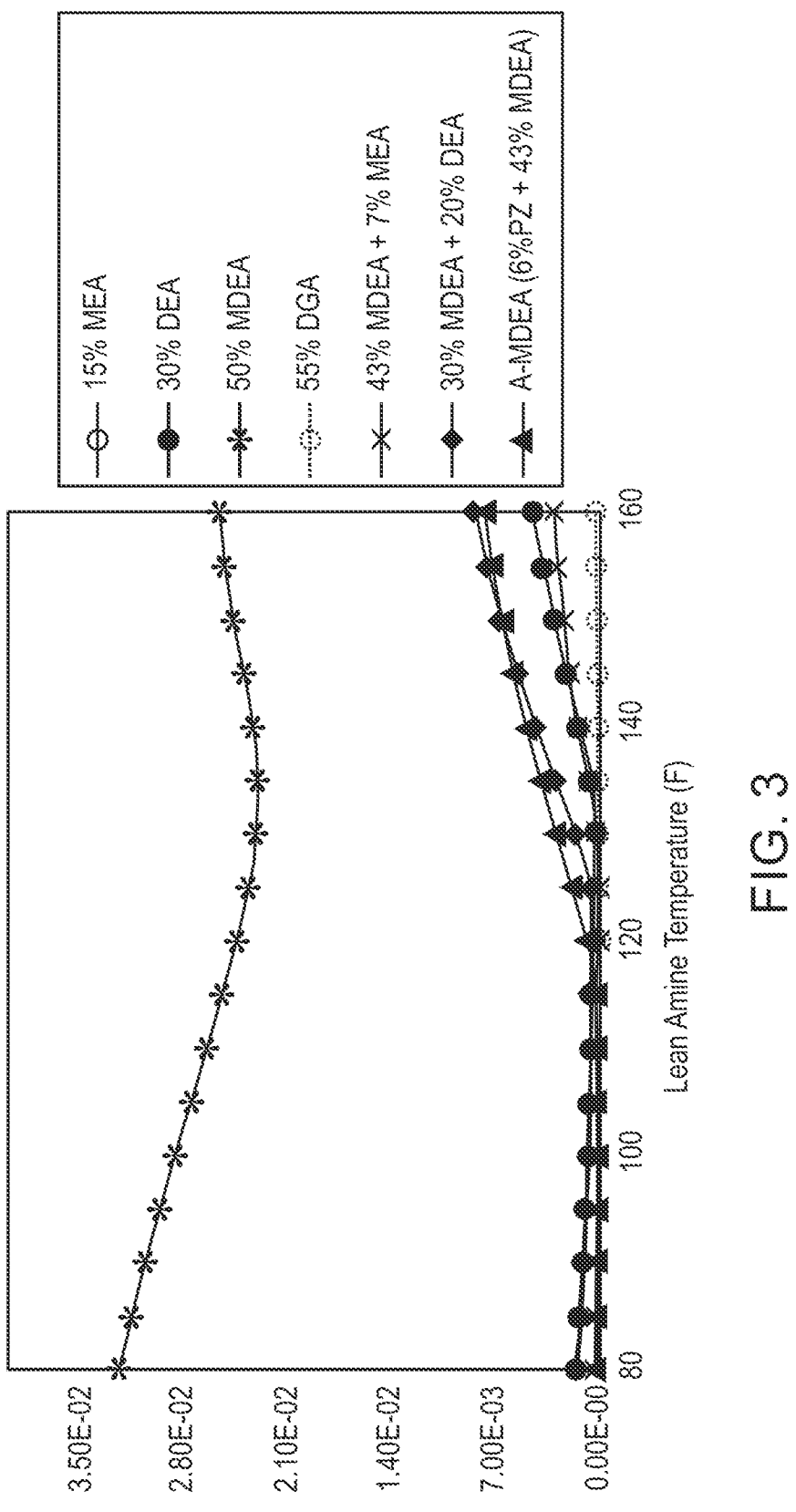
FIG. 3 is a plot of the $CO_2$ concentration in the sweet gas is a function of the temperature of the lean amine.

FIG. 2 is a plot of the $H_2S$ concentration in the sweet gas as a function of the temperature of the lean amine. FIG. 3 is a plot of the $CO_2$ concentration in the sweet gas is a function of the temperature of the lean amine. As a result of the effect of the temperature of the lean amine on the absorption process for $H_2S$ and $CO_2$, modifying the temperature of the amine loop increases the desorption. This results in removing acid gas in a shorter period, decreasing the steam consumption.

Figure 4:
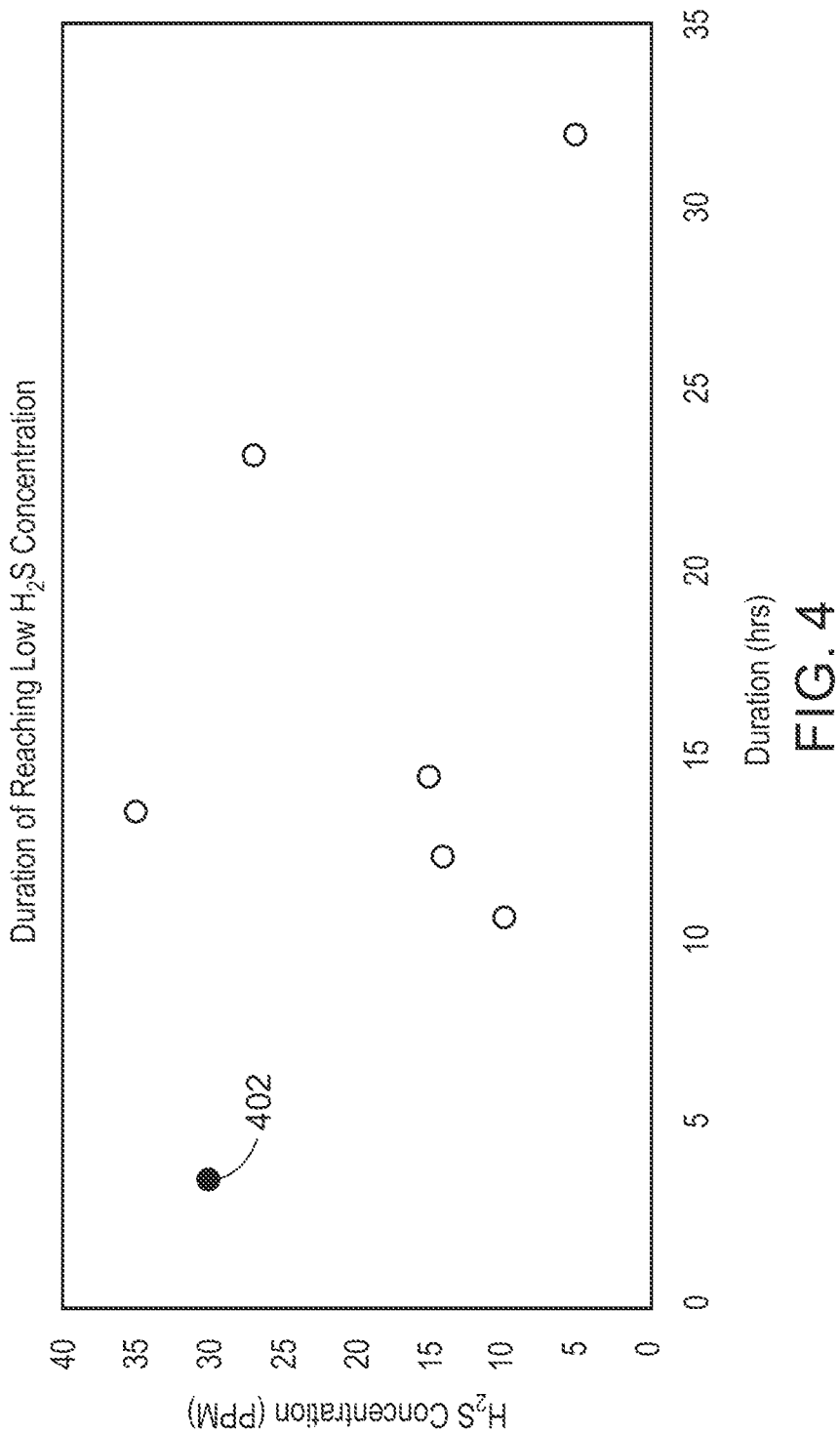
FIG. 4 is a plot comparing historical data for reaching low $H_2S$ concentration with the current techniques.

FIG. 4 is a plot comparing historical data for reaching low $H_2S$ concentration with the current techniques. The historical data was collected over 5 years of intermittent shutdowns, and showed the time needed to reach low concentrations of $H_2S$, e.g., less than about 30 ppm. The increase in regenerator overhead temperature and steam rate is restricted to not exceeding design case parameters. Thus, the analysis of the historical data showed that there is no alternative for $H_2S$ reduction except increasing the time duration. However, the present techniques decrease the time for clearance of the acid gases from the amine, as shown by point 402, was substantially decreased over previous studies, for example, to less than about 10 hours, or less than about 5 hours. By comparison, current techniques take from about 10 hours to greater than about 30 hours to clear the acid gases from the amine.

The resulting savings included avoiding 32 hours of unit shutdown, which was utilized for starting up ahead of schedule. He can be noted that some gas plants take longer or shorter depending on the acidity and composition in the sour feed gas. The earlier start up contributed to a revenue enhancement of about $5 MM of sweet gas and NGL production. Further, as the temperatures of the lean amine stream were higher, less energy was needed in the regenerator, lowering the steam consumption by 23%. Specifically, the steam flow rate to the reboiler averaged 163,000 lb/hr at the lower temperature of the lean amine, compared to a flow rate of 126,000 lb/hr at the higher temperature. The change in the steam flow rate resulted in a savings of $10,200. The fuel gas consumption was reduced by 8 MMSCF, which is equivalent to $14,300 of savings. The techniques are applicable to any gas sweetening processes used in gas plants.

Figure 5:
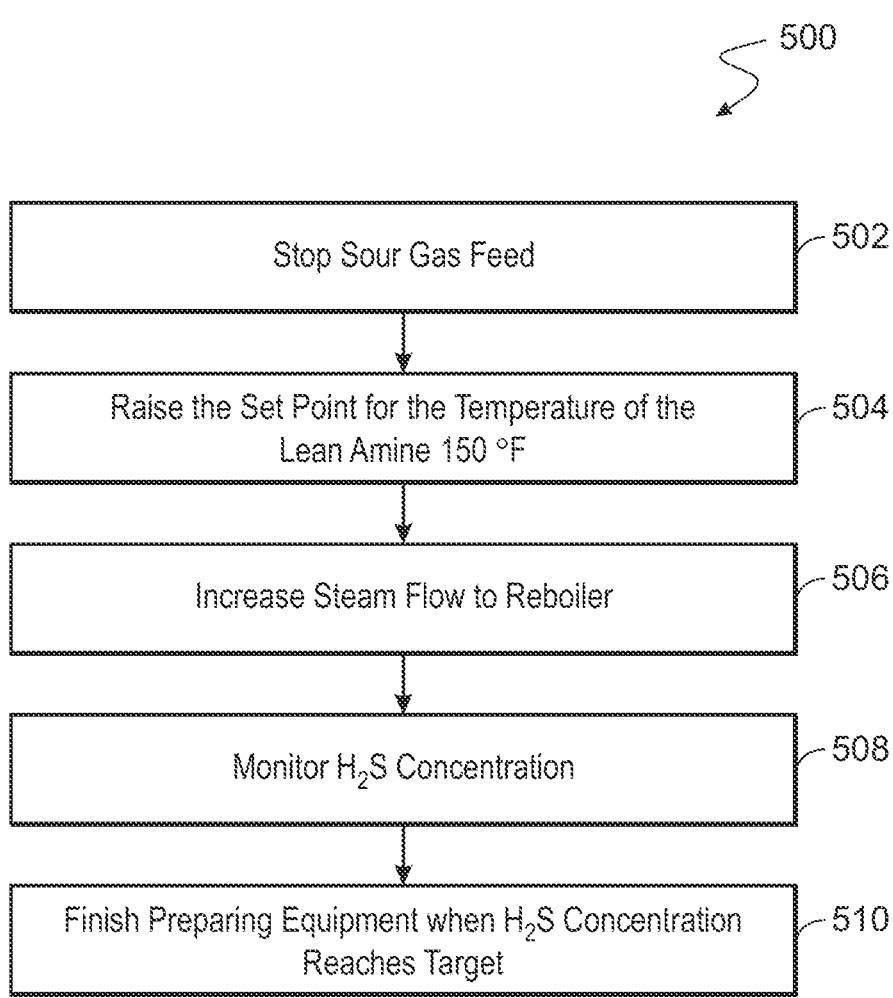
FIG. 5 is a process flow diagram of a method for clearing a gas sweetening system for maintenance.

FIG. 5 is a process flow diagram of a method 500 for clearing a gas sweetening system for maintenance. The method 500 begins at block 502, when the sour gas feed to the gas sweetening system is stopped. At block 504, the set point for the temperature of the lean amine system is increased to 150° F. This is performed by adjusting the set point of the amine fin fan cooler. In some embodiments, the temperature of the lean amine system is increased by shutting down the fans on the fin fan coolers, depending on the ambient temperature at the gas sweetening system.

At block 506, The $H_2S$ concentration is monitored, for example, by taking lean amine samples from various points in the process. In some embodiments: this may be assisted by one or more analyzers used to control the sweetening process. When the $H_2S$ concentration reaches a target value, for example, less than about 50 ppm, less than about 30 ppm, less than about 20 ppm or less than about 10 ppm, at block 508, the preparation for the maintenance of the equipment can be completed. For example, the amine may be drained to a storage tank.

Once the maintenance is complete, the gas sweetening system can be placed back into service. For example, the amine can be transferred from the storage tank back to the amine system. The temperature set point of the amine fin fan cooler can be lowered back to the initial value, for example, of 130° F. Once the temperatures have stabilized, the sour gas feed can be reintroduced to the gas sweetening system.

EMBODIMENTS

An embodiment described herein provides a method for preparing a gas sweetening system for maintenance. The method includes stopping a sour gas feed to a gas sweetening system, and raising the set point for a temperature of a lean amine cooler to about 150° F. The $H_2S$ concentration in a lean amine is monitored. The preparation of the gas sweetening system for maintenance is completed when the $H_2S$ concentration reaches a target value.

In an aspect, combinable with any other aspect, monitoring the $H_2S$ concentration comprises taking samples of a lean amine for laboratory analysis.

In an aspect, combinable with any other aspect, monitoring the $H_2S$ concentration comprises tracking a concentration with an analyzer disposed on a lean amine line downstream of a regenerator.

In an aspect, combinable with any other aspect, the target value is between 0 ppm $H_2S$ and 100 ppm $H_2S$.

In an aspect, combinable with any other aspect, the target value is between 10 ppm $H_2S$ and 50 ppm $H_2S$.

In an aspect, combinable with any other aspect, the method includes completing the preparation of the equipment comprises draining the amine from the gas sweetening system to a storage tank.

In an aspect, combinable with any other aspect, the method includes placing the gas sweetening system back in service after maintenance comprising adding amine to the gas sweetening system from a storage tank.

In an aspect, combinable with any other aspect, the method includes lowering the set point for the temperature of the lean amine cooler to 130° F.

In an aspect, model with any other aspect, the method includes restarting the sour gas feed to the gas sweetening system.

Other implementations are also within the scope of the following claims.

What is claimed is:

1. A method for preparing a gas sweetening system for maintenance, comprising:
    stopping a sour gas feed to a gas sweetening system;
    raising the set point for a temperature of a lean amine cooler to about 150° F.;
    monitoring an $H_2S$ concentration in a lean amine; and
    completing the preparation of the gas sweetening system for maintenance when the $H_2S$ concentration reaches a target value.

2. The method of claim 1, wherein monitoring the $H_2S$ concentration comprises taking samples of a lean amine for laboratory analysis.

3. The method of claim 1, wherein monitoring the $H_2S$ concentration comprises tracking a concentration with an analyzer disposed on a lean amine line downstream of a regenerator.

4. The method of claim 1, wherein the target value is between 0 ppm $H_2S$ and 50 ppm $H_2S$.

5. The method of claim 1, wherein the target value is about 30 ppm $H_2S$.

6. The method of claim 1, wherein completing the preparation of the system comprises draining the lean amine from the gas sweetening system to a storage tank.

7. The method of claim 1, comprising placing the gas sweetening system back in service after maintenance comprising adding amine to the gas sweetening system from a storage tank.

8. The method of claim 7, comprising, after adding the amine to the gas sweetening system, lowering the set point for the temperature of the lean amine cooler to 130° F.

9. The method of claim 7, comprising restarting the sour gas feed to the gas sweetening system.

\* \* \* \* \*